Feb. 19, 1952   H. G. STILBORN   2,586,110
ANIMAL TUNNEL TRAP
Filed Aug. 31, 1949
FIG 2
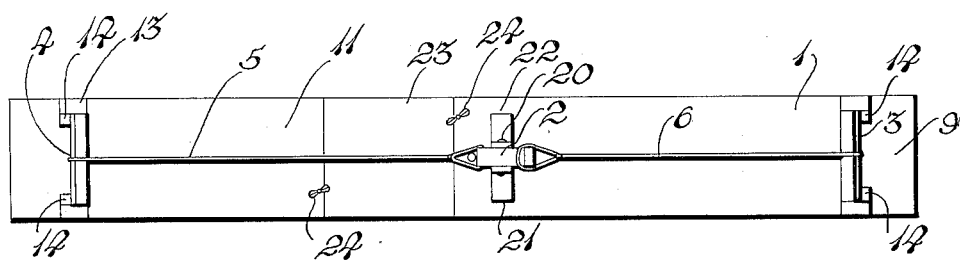
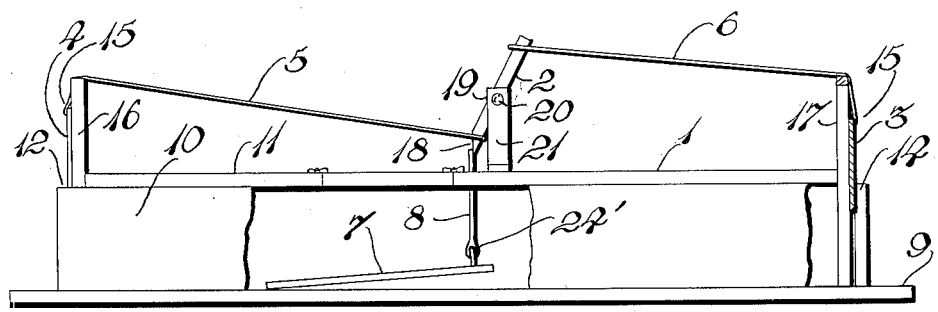
FIG 1
Inventor:
Henry G. Stilborn.
By: his Atty's.

Patented Feb. 19, 1952

2,586,110

UNITED STATES PATENT OFFICE 2,586,110

ANIMAL TUNNEL TRAP

Henry G. Stilborn, Moosomin, Saskatchewan, Canada

Application August 31, 1949, Serial No. 113,406

1 Claim. (Cl. 43—61)

My invention pertains to animal traps, particularly for the trapping of rodents, small fur-bearing animals, and the like, an object of my invention being to provide a trap of the style and form described hereinafter, which will not harm or injure the animal caught therein, thus reducing the hazard of trapping around a farm, for example, whereby domestic animals or fowl are endangered by more conventional, inhumane types of trapping devices.

Another object of my invention is to provide a device of the character herewith described for trapping fur-bearing animals which will neither damage the pelt, nor break bones, both of which are frequently the result of using conventional traps.

A further object of my invention is to provide a device for trapping or capturing animals, such as rats, which are known to be suspicious of "closed" types of trapping devices. Instead, my invention exploits the tendency of such animals to hide, or seek shelter in a horizontal hollow log or culvert, which my open-ended tunnel form resembles. It thus allays the animal's fear of man-made structures, and enhances its lure.

A still further object of my invention is to provide a trap such as is described hereinafter, and which requires no bait or other similar lure.

A yet further object of my invention is to provide a trap, the operation of which is independent of springs and vice-like jaws which can sometimes accidentally spring and injure the person engaged in the setting operation.

Yet another object of my invention is to provide a device of the character herewithin described which is economical in manufacture, extremely simple in operation, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation, a part of which is broken away to show the interior of my device.

Figure 2 is a top plan view of my device.

In the drawings like characters of reference indicate corresponding parts in the different figures.

My invention is comprised of the following major parts: A generally tunnel-like, elongated, trap body 1, a trigger 2, end gates 3 and 4, operated from said trigger by means of cables 5 and 6, actuated by the treadle 7 and trigger-rod 8.

The trap body 1 is of rectangular, transverse, open-ended cross-section, the base 9 extending beyond the sides 10 and the top 11 for stability. It will also be seen from the drawing herein that the end portions 12 and 13 of the sides 10 extend slightly beyond the top 11. In these end-portions, guides 14 are provided for the vertically sliding gates 3 and 4. The means for actuating these sliding gates consists of the cables 5 and 6 fastened to the upper edges 15 of the gates. The cables run over end-guides 16 and 17, the tops of which act as fair-lead for the cable. The other ends of the cables are looped so as to fit loosely over the ends of the trigger 2, the lower end of which is chamfered as at 18 to provide better bearing for the trigger rod 8. The trigger is pivoted at 19 and is supported upon a shaft 20 which runs in two uprights 21 and 22 secured to the top 11 of the trap-body. It will be noted, particularly in Figure 2, that the aforesaid top is provided with a removable section 23 which is secured with two conventional turnbuttons 24. The lower end of the trigger rod 8 is attached by means of an eye 24' to the aforesaid treadle, this component taking the form of an inclined surface engageable with the trigger rod.

To set the trap, the treadle 7 is raised at the hinged end to incline the surface thereof, the top opening 23 being utilised for this purpose. Thus the trigger rod 8 is elevated to engage with the chamfered end of the trigger 2 after the looped end of cable 5 has been slipped up over the lower lever arm end of the trigger, which in turn raises and retains in raised position end gate 4. The other gate 3 is raised by slipping the looped end of cable 6 over the upper lever arm end of the trigger 2. No further baiting or setting is required. An animal seeking refuge in the interior of the tunnel trap will progress along on to the treadle. Its weight will depress the aforesaid treadle thus springing the trap. It is evident that this is accomplished by releasing the trigger, whence the trigger rod is lowered from its inclined position. It will, because of the two-tensioned cables, rotate to a position approaching the horizontal, thus slipping the cable ends. These in turn cease to support the end gates which proceed to drop into the closed position confining the animal within the tunnel trap.

By way of further explanation, it is to be noted that my invention can be manufactured in either metal or wood, but the treadle 7 and base 9 should be preferably made of the latter material, since, as is well known, some animals, rodents in particular, are quite suspicious of metallic objects and will avoid treading upon them.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A tunnel-trap for rodents, fur-bearing animals and the like comprising in combination an elongated, open-ended trap casing of substantially rectangular cross-section, a vertically sliding gate at each end of said casing, guides secured to said casing within which said gates slide, and means for operating said gates to close said casing, said means comprising a treadle in said casing, a trigger-rod secured to said treadle, said treadle comprising a rectangular plate one end of which engages with the floor of said casing, the other end of which being pivotally secured to the lower end of said trigger-rod, and means actuated by said trigger-rod to cause said gates to drop thereby closing said casing, said means comprising a pair of uprights secured to the upper side of said casing, a lever pivoted between said uprights capable of rotation in a vertical plane, cables extending from each end of said lever to a point adjacent the upper ends of said gates, each cable being connected to a different gate, an inclined surface on the lower end of said lever when viewed in place engageable with the upper end of said trigger-rod, the weight of said gates rotating said lever when the upper end of said trigger-rod is disengaged therefrom by pressure upon said treadle.

HENRY G. STILBORN.

REFERENCES CITED

The following references are of record in the file of this patent:

UNITED STATES PATENTS

| Number | Name | Date |
|---|---|---|
| 305,664 | Bryan | Sept. 23, 1884 |
| 2,155,006 | Cooper | Apr. 18, 1939 |

FOREIGN PATENTS

| Number | Country | Date |
|---|---|---|
| 10,235 | Great Britain | of 1912 |